(12) United States Patent
Quiring et al.

(10) Patent No.: US 9,051,991 B2
(45) Date of Patent: Jun. 9, 2015

(54) INTERNAL COMBUSTION ENGINE WITH MASS BALANCING AND METHOD FOR OPERATING SUCH AN INTERNAL COMBUSTION ENGINE

(75) Inventors: Stefan Quiring, Leverkusen (DE); Bernd Steiner, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 378 days.

(21) Appl. No.: 13/559,498

(22) Filed: Jul. 26, 2012

(65) Prior Publication Data

US 2013/0036996 A1 Feb. 14, 2013

(30) Foreign Application Priority Data

Aug. 8, 2011 (DE) .......................... 10 2011 080 602

(51) Int. Cl.
*F02B 75/06* (2006.01)
*F16F 15/26* (2006.01)
*F16F 15/14* (2006.01)

(52) U.S. Cl.
CPC .............. *F16F 15/264* (2013.01); *F16F 15/14* (2013.01)

(58) Field of Classification Search
CPC .................................. F16F 15/264; F16F 15/14
USPC ..................................................... 123/192.2
See application file for complete search history.

(56) References Cited

U.S. PATENT DOCUMENTS

| 4,556,026 A | * | 12/1985 | Masuda et al. | ............. | 123/198 F |
| 4,569,316 A | * | 2/1986 | Suzuki | ........................ | 123/192.1 |
| 5,740,768 A | | 4/1998 | Sakurai et al. | | |
| 6,581,495 B2 | * | 6/2003 | Cagney et al. | .................. | 74/603 |
| 7,086,366 B1 | | 8/2006 | Killion | | |
| 7,556,012 B2 | | 7/2009 | Quiring et al. | | |
| 7,617,810 B1 | * | 11/2009 | Phillips et al. | ............. | 123/192.2 |
| 7,637,240 B2 | * | 12/2009 | Onigata | ..................... | 123/192.2 |
| 2012/0199094 A1 | | 8/2012 | Roehrig et al. | | |

FOREIGN PATENT DOCUMENTS

DE 102009047545 A1 6/2011
EP 2256315 A1 3/2009

* cited by examiner

*Primary Examiner* — Marguerite McMahon
*Assistant Examiner* — James Kim
(74) *Attorney, Agent, or Firm* — Julia Voutyras; Alleman Hall McCoy Russell & Tuttle LLP

(57) ABSTRACT

Embodiments for mass balancing an engine are provided. In one example, an internal combustion engine having at least one cylinder which is associated with a crank drive comprises at least one mechanically driven balancing unit for balancing the mass forces, the balancing unit including at least one balancing weight which serves as an unbalance by initially rotating a first mass about a rotational axis relative to a second mass when the balancing unit is operational, and an interrupter unit to disconnect the at least one balancing unit from the mechanical drive in a switched off state and connect it to the mechanical drive in a switched on state.

20 Claims, 4 Drawing Sheets

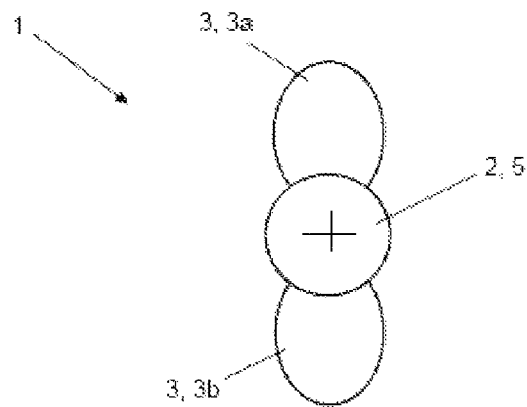
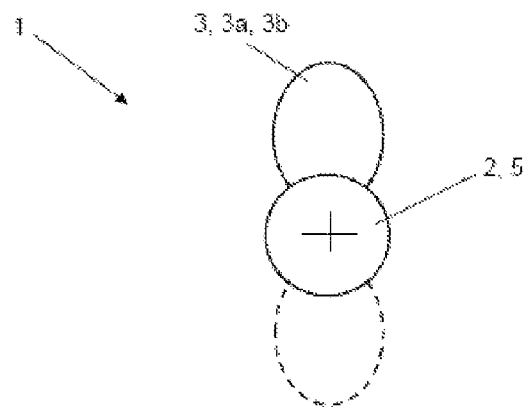
FIG. 2a    FIG. 2b
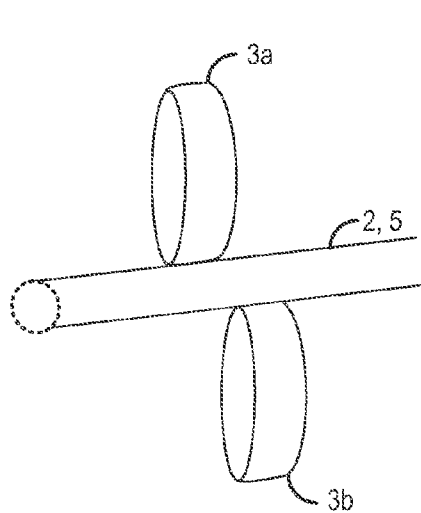
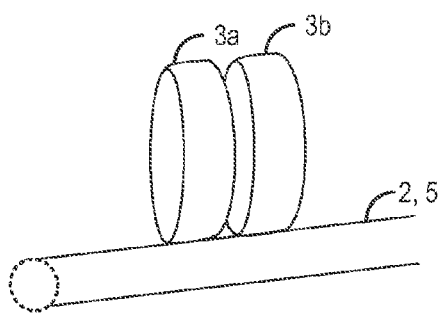
FIG. 2c    FIG. 2d

INTERNAL COMBUSTION ENGINE WITH MASS BALANCING AND METHOD FOR OPERATING SUCH AN INTERNAL COMBUSTION ENGINE

RELATED APPLICATIONS

The present application claims priority to German Patent Application Number 102011080602.4 filed on Aug. 8, 2011, the entire contents of which are hereby incorporated by reference for all purposes.

FIELD

The disclosure relates to an internal combustion engine.

BACKGROUND AND SUMMARY

Vibrations are becoming increasingly significant for the design and configuration of engine vehicles and internal combustion engines. It is attempted inter alia, to influence in a targeted manner and model the sound generated by the internal combustion engine. Measures in this context are also combined under the term sound design. Such development work is also motivated by the realization that the customer's decision to purchase a vehicle is influenced to a significant and increasing degree, even decisively, by the sound of the internal combustion engine or of the vehicle. For example, the driver of a sports car prefers a vehicle or engine whose sound emphasises the sporty character of the vehicle.

In the scope of a sound design, vibrations are compensated, e.g., eliminated or extinguished, or individual vibrations of a specific frequency are isolated, filtered out and, if appropriate, modelled.

The following can be differentiated as noise sources on an engine vehicle: flow noise, noise due to the emission of solid-borne sound, and noise due to the introduction of solid-borne sound into the vehicle bodywork via the engine mount.

Flow noise includes, for example, the noise at the mouth of the exhaust, the intake noise and the noise of the fan, while the noise due to the emission of solid-borne sound includes the actual engine noise and the emission of the exhaust system. The engine structure which is made to oscillate by shocks and alternating forces irradiates the solid-borne sound as airborne sound via its engine surfaces and in this way generates the actual engine noise.

The introduction of solid-borne sound via the engine mount, in particular the introduction of solid-borne sound into the vehicle bodywork, is of particular significance for the acoustic driving comfort.

The internal combustion engine and the associated secondary assemblies are systems are capable of oscillating and whose oscillatory behavior can be influenced. The most relevant components with shock excitation and force excitation are the crank casing, the cylinder block, the cylinder head, the crank drive, the piston and the valve drive. These components are subject to the mass forces and gas forces. The crank drive comprises here, in particular, the crankshaft, the piston, the piston pin and the connecting rod and forms the system which is capable of oscillating which is relevant for the method according to the disclosure.

The crankshaft is made to undergo rotational oscillations by the rotational forces which change over time and which are introduced into the crankshaft via the connecting rods which are coupled to the individual crank pins. These rotational oscillations give rise both to noise due to the emission of solid-borne sound and to noise due to the introduction of solid-borne sound into the bodywork and into the internal combustion engine. When the crankshaft is excited in the natural frequency range, large rotational oscillation amplitudes may occur which can even lead to fatigue fracture. This shows that the oscillations are of interest not only in conjunction with a sound design but rather also with respect to the strength of the components.

The rotational oscillations of the crankshaft are transmitted in an undesirable fashion to the camshaft via the control drive or camshaft drive, wherein the camshaft itself also presents an oscillatory system and can cause other systems, in particular the valve drive, to oscillate. In addition, the oscillations of the crankshaft are introduced into the drive train, via which they can be passed on to the tires of a vehicle.

The rotational force profile at a crankshaft throw of a four stroke internal combustion engine is periodical, wherein the periods extend over two revolutions of the crankshaft. The rotational force profile is usually decomposed into its harmonic components by means of Fourier analysis in order to be able to make statements about the excitation of rotational oscillations. In this context, the actual rotational force profile is composed of a constant rotational force and a multiplicity of harmonically changing rotational forces which have different rotational force amplitudes and frequencies or oscillation rates. The ratio of the oscillation $n_i$ of each harmonic to the rotational speed n of the crankshaft or of the engine is referred to as the order i of the harmonic.

Due to the high dynamic load on the crankshaft as a result of the mass forces and gas forces, the designers attempted, when configuring the internal combustion engine, to implement mass balancing which is as wide ranging as possible, e.g., is optimized. In this context, the term "mass balancing" combines all the measures which compensate or reduce the effect of the mass forces toward the outside. To this extent, the method according to the disclosure for balancing the mass forces relates not only to the mass forces as such but also to the moments which are caused by the mass forces.

In this context an approach to the solution is targeted adjustment of the throw of the crankshaft, of the number and of the arrangement of the cylinders and of the ignition sequence in such a way that the best possible mass balancing is achieved.

A six-cylinder in-line engine can be balanced in this way. The six cylinders are combined in pairs in such a way that they run in parallel mechanically as a cylinder pair. The first and sixth cylinders, the second and fifth cylinders and the third and fourth cylinders are therefore combined to form a cylinder pair, wherein the crankshaft pins or crankshaft throws of the three cylinder pairs are each arranged offset by 120° CA on the crankshaft. Running mechanically in parallel means that the two pistons of the two cylinders which run mechanically in parallel are located at the same ° CA (degrees crank angle) at the top dead center (TDC) or bottom dead center (BDC). When a suitable ignition sequence is selected, the mass forces are balanced.

In the case of a three-cylinder in-line engine, the mass forces of the first order and the mass forces of the second order can also be balanced by selecting a suitable crankshaft throw and a suitable ignition sequence, but not the moments which are caused by the mass forces.

Complete mass balancing, as in the case of the aforementioned six-cylinder in-line engine, may not be implemented in every condition, with the result that further measures have to be taken, for example arranging counter weights on the crankshaft and/or equipping the internal combustion engine with at least one balancing shaft.

The starting point of these measures is that the crankshaft is loaded by the rotational forces which change over time and which are composed of the gas forces and mass forces of the crank drive. The masses of the crank drive, for example the individual masses of connecting rod, of the piston, of the piston pin and of the piston rings, can be transferred into an oscillating equivalent mass and a rotating equivalent mass. The mass force of the rotating equivalent mass can easily be balanced in terms of their external effect by counterweights arranged on the crankshaft.

The balancing of the rotating mass force caused by the oscillating equivalent mass is more complex, said mass force being approximately composed of a mass force of the first order, which rotates at the engine speed and a mass force of the second order which rotates at twice the engine speed, with higher order forces being negligible.

The rotating mass forces of any order can be virtually completely balanced by the arrangement of two shafts, referred to as balancing shafts, which rotate in opposite directions and are provided with corresponding weights. The shafts for the balancing of the mass forces of the first order rotate here at the engine speed and the shafts for the balancing of the mass forces of the second order rotate at twice the engine speed.

Even in the case of complete balancing of the rotating mass forces, mass moments can be produced since the mass forces of the individual cylinders act in the central planes of the cylinders. These mass moments can in an individual case again be compensated by a balancing shaft which is equipped with weights.

The moments caused by the mass forces of the first order, for example in the case of a three-cylinder in-line engine, can be compensated by a single balancing shaft which rotates at the engine speed in the opposite direction to the crankshaft and at whose ends two balancing weights which are arranged offset through 180° and serve as an unbalance are provided.

The provision of one balancing shaft or, if appropriate, a plurality of balancing shafts not only increases the spatial requirement and the costs but also the fuel consumption. The increased fuel consumption is caused, on the one hand, by the additional weight of the balancing unit, in particular of the shafts, and of the counterweights which serve as an unbalance and which perceptibly increase the overall weight of the drive unit. On the other hand, the balancing unit with its rotating shafts and other moving components contributes significantly to the friction loss of the internal combustion engine and to the increasing of this friction loss. The latter has relevance, in particular, due to the fact that the balancing unit is continuously operational as soon as the internal combustion engine starts and is operated. The mass forces are balanced continuously here without it being taken into account whether or not the instantaneous operating state of the internal combustion engine at all demands such mass balancing, for example for reasons of the noise design.

It would therefore be possible to dispense with balancing of the moments caused by the mass forces of the first order in a three-cylinder in-line engine at relatively high engine speeds since the noise caused by the oscillations is evaluated as being problematic only at low rotational speeds and during idling, and there is a risk of excitation in the region of the natural frequency only in this rotational speed range. On the other hand, at relatively high rotational speeds mass balancing may be dispensed with.

The inventors herein have recognized the above issues and offer an approach for mass balancing with relatively low friction loss. Accordingly, an internal combustion engine having at least one cylinder which is associated with a crank drive comprises at least one mechanically driven balancing unit for balancing the mass forces, the balancing unit including at least one balancing weight which serves as an unbalance by initially rotating a first mass about a rotational axis relative to a second mass when the balancing unit is operational, and an interrupter unit to disconnect the at least one balancing unit from the mechanical drive in a switched off state and connect it to the mechanical drive in a switched on state.

The internal combustion engine according to the disclosure uses, for the mass balancing, a switchable balancing unit which can be activated, e.g., switched on, when balancing is indicated but also deactivated, e.g., switched off, when balancing is not indicated, in order to reduce the friction loss.

The at least one balancing unit can be switched by virtue of the fact that according to the disclosure an interrupter unit is provided which disconnects the balancing unit, e.g., the mass balancing, from the mechanical drive for the purpose of deactivation. For this purpose, the force flux between the mechanically driven balancing unit and the mechanical drive has to be interrupted, for example by a clutch, which is opened in order to switch off the balancing unit.

In the case of a three-cylinder in-line engine it is possible in this way for mass balancing to take place at low rotational speeds and in the idling mode, with mass balancing being dispensed with toward relatively high rotational speeds by switching off the balancing unit, in order to reduce the friction loss and therefore the fuel consumption. In the case of mechanically driven balancing units, the balancing shafts which are used are generally or preferably arranged underneath the crank casing.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2a and 2c show side views of a balancing weight of the embodiment of a balancing unit illustrated in FIG. 1, in the position of rest.

FIGS. 2b and 2d show side views of the balancing weight illustrated in FIG. 2a, in the working position.

DETAILED DESCRIPTION

Figure 1:
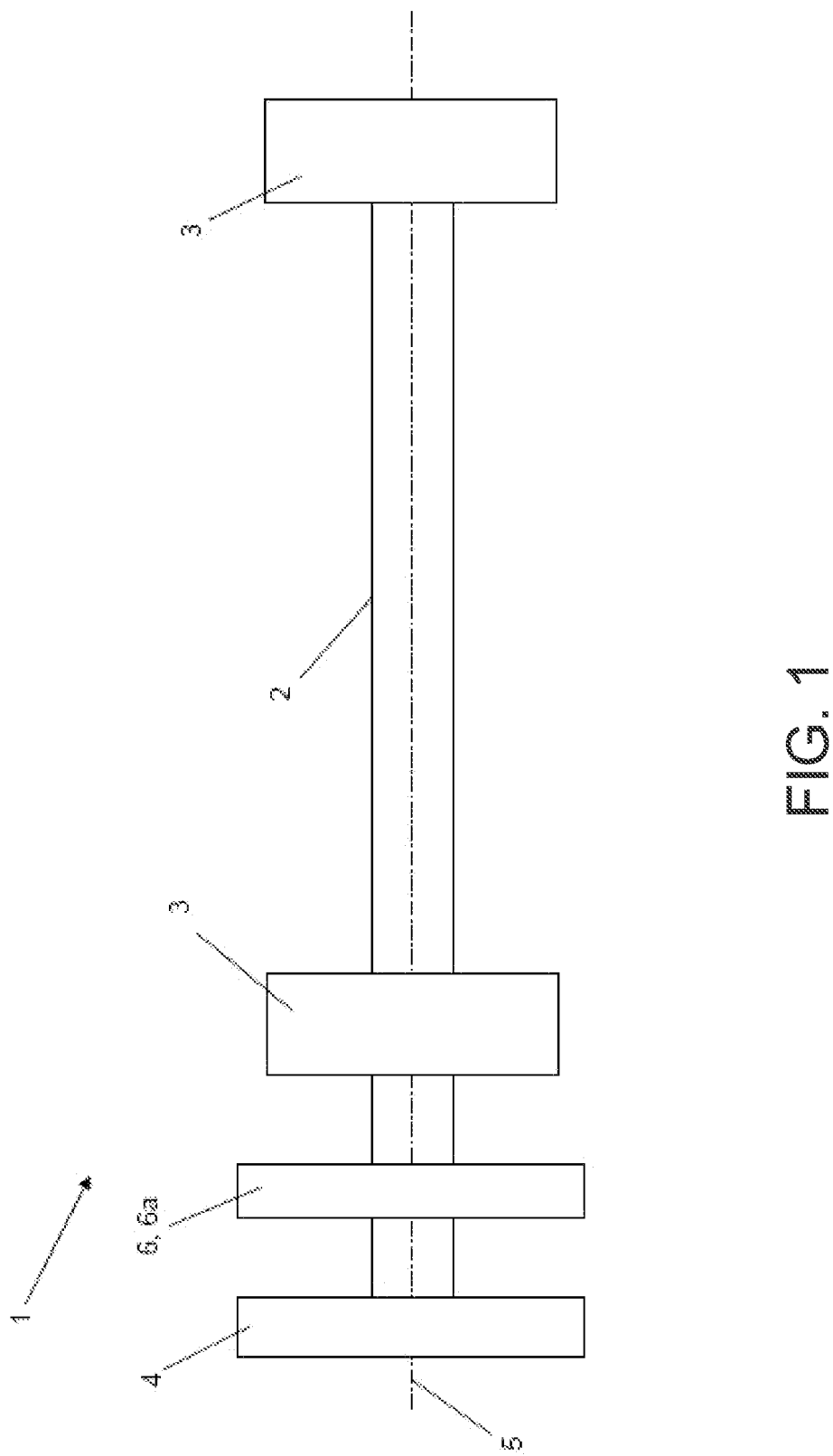
FIG. 1 shows a first embodiment of a balancing unit.

FIG. 1 shows a first embodiment of a balancing unit 1. The illustrated balancing unit 1 comprises a shaft 2 on which two balancing weights 3 which are spaced apart from one another are arranged.

The shaft 2 has, at a free end, a drive gear 4, which also forms the mechanical drive 4. In order to interrupt the force flux between the balancing unit 1 and/or the balancing weights 3 and the mechanical drive 4, an interrupter unit 6 is provided. In the embodiment illustrated in FIG. 1, a clutch 6a serves as an interrupter unit 6, wherein the clutch 6a is arranged between the drive gear 4 and the balancing weights 3.

By opening the clutch 6a, the force flux between the drive gear 4 and the balancing weights 3 is interrupted and the balancing unit 1 is switched off. In the switched on state, the balancing weights 3 are connected to the mechanical drive 4 by closing the clutch 6a, with the result that the balancing weights 3 can rotate about the rotational axis 5.

In FIG. 1, the two balancing weights 3 are illustrated in the position of rest, as they are also in FIG. 2a.

FIGS. 2a and 2b show side views of a balancing weight 3 of the embodiment of a balancing unit 1 illustrated in FIG. 1, in the position of rest. The balancing weight 3 which serves as an unbalance comprises two segments 3a, 3b which are embodied in the manner of wings and can be rotated with respect to one another about the rotational axis 5 which is perpendicular to the plane of the drawing. The two segments 3a, 3b are arranged rotated through 180° on the shaft 2. In this position of rest, the two segments 3a, 3b therefore neutralize one another in their external effect.

By rotating one of the two segments 3b, an unbalance is generated and the balancing weight 3 which serves as an unbalance is formed. In the working position, the two segments 3a, 3b no longer have an offset, for which purpose the second segment 3b is rotated through 180°.

FIGS. 2b and 2d show side views of the balancing weight 3 illustrated in FIG. 2a, in the working position, with the original position of the second segment 3b, e.g. the position of rest, being illustrated by dashed lines in FIG. 2b.

As seen in FIG. 2d, when the second segment 3b is rotated, the first and second segments 3a, 3b become substantially aligned in order to rotate around the shaft together. Thus, the balancing unit depicted in FIGS. 2b and 2d may include two masses, a first mass and a second mass, illustrated in FIGS. 2b and 2d as segments 3a and 3b. When the balancing unit is not activated, e.g., is in the position of rest, the first and second masses are arranged on opposite sides of a shaft relative to each other, for example the second mass may be rotated 180° relative to the first mass. When the balancing unit is activated, the second mass may be moved relative to the first mass until the first and second masses are aligned on the same side of the shaft.

To move the second mass relative to the first mass, the first and second masses may be arranged on a shaft that includes multiple segments configured to be rotated independently of each other. Thus, the segment of the shaft on which the first mass is arranged may remain stationary, and the segment of the shaft on which the second mass is arranged may rotate. Once the masses are aligned, the shaft segments may be rotated together. Alternatively, the second mass may be moved into alignment via an electromagnet, hydraulically, or by another mechanism.

The balancing unit may be installed on an internal combustion engine, and may be driven mechanically via the crankshaft of the engine. Examples of the internal combustion engine in which the mechanical drive of the at least one balancing unit is a traction mechanism are advantageous.

In internal combustion engines, belt drives or chain drives are frequently used for driving secondary assemblies and the like, said belt drives or chain drives being usually referred to as a traction mechanism (and are also referred to in this way within the scope of the present disclosure), wherein a belt or a chain represents the traction means.

The traction mechanism is intended to transmit a large torque with the lowest possible energy losses and with as little maintenance expenditure as possible by re-tensioning. In this context, the drive of a plurality of secondary assemblies is frequently combined in one traction mechanism. In order to keep the traction means under tension and therefore ensure drive which is as secure and free of wear as possible, tensioning devices which direct the traction means and apply a force to it in the transverse direction with respect to the pulling direction, are frequently provided at a suitable location on the drive, with the result that the drive means is and is kept continuously under tension.

In conjunction with mass balancing, it is of particular significance to ensure a slip-free drive since the balancing weights may not be positioned with respect to the crankshaft in a desired fashion. In this respect, the chain as a traction means has advantages over a smooth belt.

For this reason also, examples of the internal combustion engine may be advantageous in which the mechanical drive of the at least one balancing unit is a gearwheel drive which ensures a slip-free drive.

Examples of the internal combustion engine in which the interrupter unit comprises a clutch are advantageous.

By means of a clutch, the force flux between the mechanically driven balancing unit and the mechanical drive can be reliably interrupted, specifically by opening the clutch.

If the at least one balancing unit comprises a shaft at whose one free end a drive gear is arranged, a friction clutch can be provided between the drive gear and the shaft or between the drive gear and the balancing weights arranged on the shaft.

When a gearwheel drive is used, the force flux can also be interrupted by disengaging one of the gearwheels, with the result that the gearwheels are no longer in engagement with one another in the switched off state of the balancing unit.

Examples of the internal combustion engine in which the at least one balancing weight which serves as an unbalance has at least two segments which can be rotated about the rotational axis with respect to one another are advantageous.

This example is specifically advantageous with respect to the switching on process of the at least one balancing unit during which the balancing unit is synchronized with the crank drive and the rotational speeds of the crankshaft and of the balancing weight are adapted or matched to one another. Under certain circumstances the balancing weights then have to be accelerated from the stationary state. Since the balancing weights do not rotate in synchronism with the crankshaft during the acceleration process, it would be disadvantageous if the balancing weights already produce their full effect as an unbalance. For this reason, the two segments which form the balancing weight are preferably positioned offset with respect to one another through 180° at the start of the switching on process with the result that the segments cancel one another out in their external effect, e.g., neutralize one another. By rotation of one of the two segments the unbalance is first generated and the at least one balancing weight which serves as an unbalance is formed. In the working position, the two segments preferably no longer have any offset, for which purpose a segment is rotated through 180°.

Examples of the internal combustion engine in which means are provided which serve to synchronize the at least one balancing unit with the crank drive during the switching on process are advantageous.

In order to bring about mass balancing, the at least one balancing weight of the balancing unit, which balancing weight serves as an unbalance and rotates about a rotational axis, may have a specific, permanently predefined position with respect to the crankshaft, e.g., in relation to the crank drive. To this extent, the balancing unit may be synchronized with the crank drive within the scope of the switching on process.

In this context, examples of the internal combustion engine in which means for positioning, for example a stop and/or a locking means, are provided are advantageous.

In internal combustion engines which are equipped with an engine controller, examples of the internal combustion engine are advantageous which are defined by the fact that the at least one balancing unit is switched and/or synchronized by means of an engine controller.

Examples of the internal combustion engine in which three cylinders which are arranged in line are provided are advantageous. Three-cylinder in-line engines have the advantage that the mass forces of the first order and the mass forces of the second order can be balanced by selecting a suitable crankshaft throw and a suitable ignition sequence.

For this reason, examples of the three-cylinder in-line engine in which the mass forces of the first order and of the second order are balanced by selecting a suitable crankshaft throw and a suitable ignition sequence are also advantageous.

The mass moments which are caused by the mass forces of the first order can be compensated by a single balancing shaft which rotates at the engine speed in the opposite direction to the crankshaft and at whose ends two balancing weights which are arranged offset through 180° and serve as an unbalance are provided.

For this reason also, examples of the three-cylinder in-line engine are advantageous in which the at least one balancing unit comprises two balancing weights which are arranged spaced apart from one another on a shaft, are positioned offset through 180° and balance the resulting mass moment which is effective in the central plane running through the internal cylinder.

In this context, examples of the internal combustion engine are advantageous in which the balancing weights which have offset positions are at the same distance from the central plane of the internal cylinder and have an equally large mass.

Figure 3:
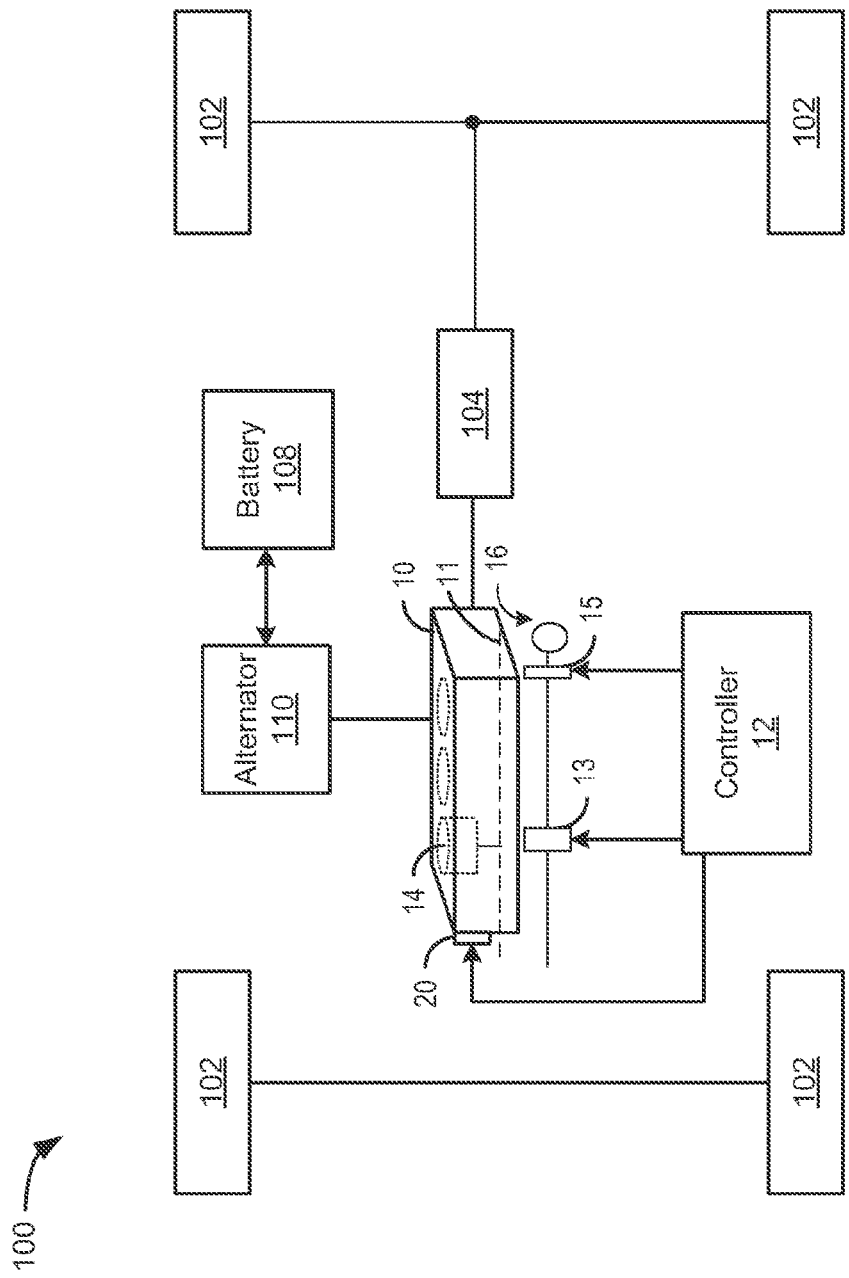
FIG. 3 schematically shows an example vehicle including an engine and a balancing unit.

As explained above, the balancing unit may be placed on an engine installed in a vehicle. FIG. 3 is a schematic depiction of vehicle 100. Vehicle 100 includes wheels 102. Torque is supplied to wheels 102 via engine 10 and transmission 104. In some examples, an electric motor or hydraulic motor may also provide torque to wheels 102. An alternator 110 may be mechanically coupled to engine 10 via a shaft or pulley. Battery 108 and alternator 110 may provide electrical power to various engine accessory components not shown in FIG. 3.

Engine 10 includes a plurality of cylinders 14. Herein, engine 10 is depicted as a three cylinder in-line engine; however other cylinder arrangements are within the scope of this disclosure. The cylinders 14 receive intake air via an intake passage, combust fuel, and expel exhaust via an exhaust passage. The cylinders 14 include pistons coupled to a crankshaft 11. Also shown is a balancing unit 16. Balancing unit 16 is a non-limiting example of balancing unit 1 presented above. The balancing unit may be located on a shaft below the crankcase, for example, and may be mechanically driven via a direct or indirect coupling to the crankshaft of the engine. The balancing unit 16 includes a balancing weight 13 and a disengagement mechanism 15, such as a clutch.

Figure 4:
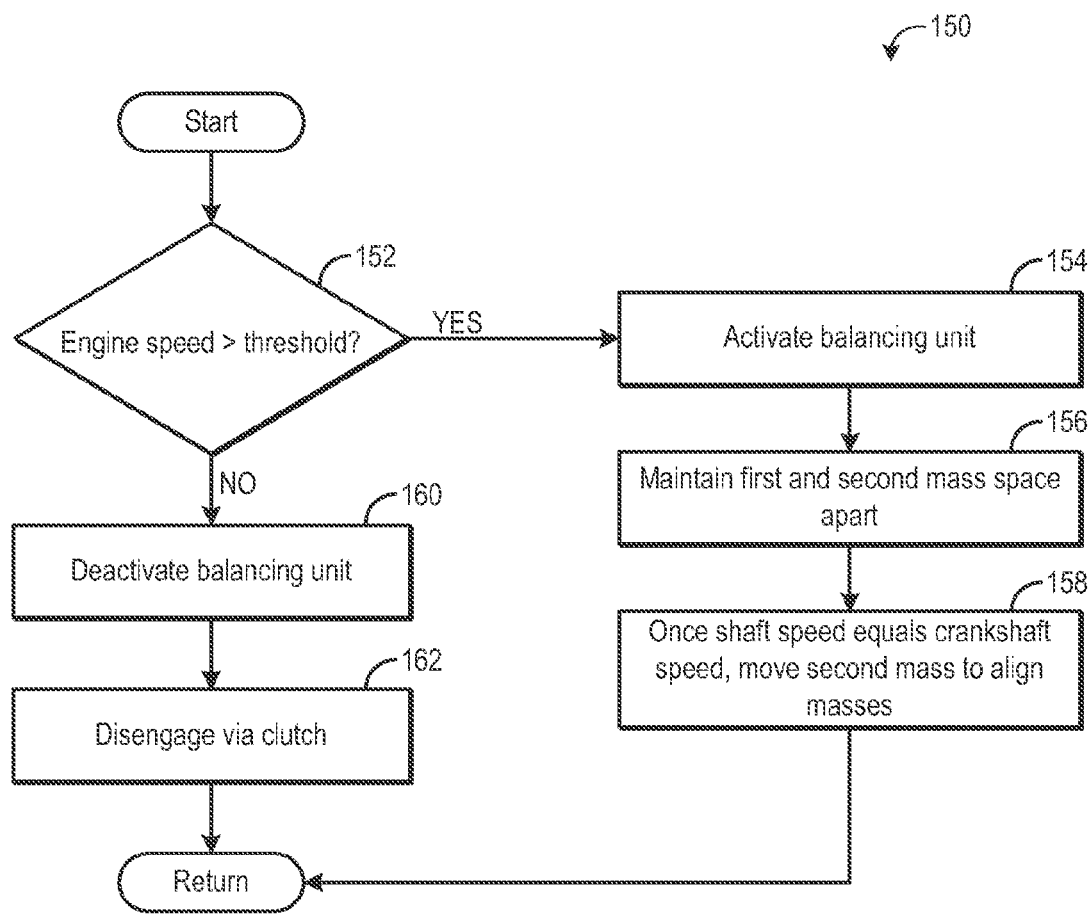
FIG. 4 is a flow chart illustrating a method for balancing an engine according to an embodiment of the present disclosure.

Controller 12 is shown in FIG. 4 as a conventional microcomputer including: a microprocessor unit, input/output ports, read-only memory, random access memory, keep alive memory, and a conventional data bus. Controller 12 is shown receiving various signals from sensors coupled to engine 10, including an engine position signal from a Hall effect sensor 20 sensing crankshaft position. In a preferred aspect of the present description, engine position sensor produces a predetermined number of equally spaced pulses every revolution of the crankshaft from which engine speed (RPM) can be determined Controller 12 is also shown controlling various aspects of the vehicle 100, including the engine 10 and balancing unit 16. In some examples, the controller 12 may control the position of the balancing weights of the balancing unit.

FIG. 4 is a flow chart illustrating a method 150 for balancing an engine utilizing a balancing unit of the present disclosure. The at least one balancing unit is switched as a function of at least one operating parameter of the internal combustion engine. Method 150 comprises, at 152, determining if the speed of the engine is greater than a threshold, such as 1000 RPMs. At low rotational speeds, the mass forces of the engine may cause noise and vibration disturbances, and thus a balancing unit may be activated to counterbalance the disturbances. At higher rotational speeds, the fuel economy of the engine may suffer due to the frictional losses of the balancing unit, and thus the balancing unit may be deactivated at speeds above the threshold.

Accordingly, if the speed of the engine is not greater than the threshold, method 150 proceeds to 154 to activate the balancing unit by rotating the shaft of the balancing unit. As explained above, the shaft may be mechanically driven, and the balancing unit may include a first mass and a second mass. Further, at 156, the first and second masses of the balancing unit are maintained spaced apart by 180° until the speed of the shaft is equal to the speed of the crankshaft. Once the speeds are equal, at 158, the second mass is moved relative to the first mass so that the masses are in alignment.

Returning to 152, if the speed of the engine is greater than the threshold, method 150 proceeds to 160 to deactivate the balancing unit. If the balancing unit was previously activated, deactivating the balancing unit may comprise disengaging the shaft via a clutch or other disengagement mechanism at 162 to interrupt the rotation of the shaft. Method 150 then returns.

What has been stated above already with respect to the internal combustion engine according to the disclosure also applies to the method according to the disclosure.

The balancing unit is switched according to the disclosure as a function of at least one operating parameter of the internal combustion engine. In the case of a three-cylinder in-line engine, the method according to the disclosure therefore permits, for example, the mass balancing at low rotational speeds and in the idling mode and toward relatively high rotational speeds by switching off the balancing unit and dispensing with mass balancing in order to reduce the friction loss and therefore the fuel consumption.

Examples of the method in which the at least one balancing unit is switched as a function of the rotational speed n of the internal combustion engine are advantageous. According to this method variant, the rotational speed n of the internal combustion engine is the at least one operating parameter as a function of which the balancing unit is switched on and off. Since the mass moments and mass forces rotate at the engine speed or a multiple of the engine speed and the associated mass balancing takes place with correspondingly rotating balancing weights, the mass balancing is, due to the principle involved, in a close relationship with the engine speed, for which reason the rotational speed n of the internal combustion engine is also a suitable operating parameter for performing open-loop and/or closed-loop control of the balancing unit or of the interrupter unit.

Examples of the method in which—assuming an operational balancing unit—the at least one balancing unit is switched off as soon as the rotational speed n of the internal combustion engine exceeds a predefinable rotational speed $n_{threshold,up}$ are advantageous.

The method variant above permits the moments caused by the mass forces of the first order at low rotational speeds and in the idling mode to be balanced in a three-cylinder in-line engine by means of a switched on or activated balancing unit, and to deactivate the balancing unit toward relatively high rotational speeds, at which there is no immediate requirement for mass balancing, when a predefined rotational speed $n_{threshold,up}$ is exceeded.

A particular advantage of the variant in question is that the balancing unit is switched off at high rotational speeds at which the friction loss is generally at a maximum, e.g., in a characteristic diagram region of the internal combustion engine in which there can be a perceptible saving in fuel by switching off the balancing unit.

In this context, examples of the method in which the at least one balancing unit is switched off as soon as the rotational speed n of the internal combustion engine exceeds the predefined rotational speed $n_{threshold,up}$ and is greater than this predefined rotational speed $n_{threshold,up}$ for a predefinable time period $\Delta t_1$ are advantageous.

The introduction of an additional condition for the switching off of the at least one balancing unit is intended to prevent excessively frequent switching, in particular deactivation of the balancing unit, if the rotational speed exceeds the predefined rotational speed only briefly and then drops again or fluctuates around the predefined value for the rotational speed without the exceeding justifying switching off of the balancing unit.

For the reasons mentioned above, method variants are also advantageous in which—assuming a nonoperational balancing unit—the at least one balancing unit is switched on as soon as the rotational speed n of the internal combustion engine undershoots a predefinable rotational speed $n_{threshold,down}$.

In this context, embodiments of the method in which the at least one balancing unit is switched on as soon as the rotational speed n of the internal combustion engine undershoots the predefined rotational speed $n_{threshold,down}$ and is lower than this predefined rotational speed $n_{threshold,down}$ for a predefinable time period $\Delta t_2$ are in turn advantageous.

Reference is made to the statements which were made in conjunction with the exceeding of the rotational speed $n_{threshold,up}$ and the time period $\Delta t_1$. The statements made with respect to these method variants apply in an analogous fashion.

In a three-cylinder in-line engine it is, for example, advantageous to activate the balancing unit when a predefined rotational speed $n_{threshold,down}$ is undershot, in order to balance the moments caused by the mass forces of the first order.

In addition to the definition of a specific rotational speed $n_{threshold,up}$ or $n_{threshold,down}$ for the switching on or switching off of the balancing unit, it is also possible to predefine rotational speed ranges within which the balancing unit is operated or else remains deactivated.

In internal combustion engines in which the at least one balancing weight which serves as an unbalance has at least two segments which can be rotated with respect to one another about the rotational axis, examples of the method may be advantageous which are defined by the fact that, assuming a nonoperational balancing unit with segments which are positioned rotated with respect to one another through 180°, during the switching on process of the balancing unit in a first method step the balancing unit is accelerated and is synchronized with the crank drive, and in a second method step the balancing weight which serves as an unbalance is formed by rotating the at least two segments.

Thus, the method and system presented above provides for an engine method comprising under a first condition, rotating a shaft to spin a balancing unit, the balancing unit including a first mass and a second mass arranged 180° apart on the shaft, and once a speed of the shaft is equal to a speed of a crankshaft of the engine, moving the second mass relative to the first mass until the first and second masses are aligned on the shaft.

The method also comprises, under a second condition, disengaging the shaft to stop the rotating of the shaft. The first condition may comprise engine speed below a threshold, and the second condition may comprise engine speed above the threshold. Disengaging the shaft may further comprise disengaging the shaft via a clutch.

It will be appreciated that the configurations and methods disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine having at least one cylinder which is associated with a crank drive, comprising:
at least one mechanically driven balancing unit for balancing mass forces, the balancing unit including at least one balancing weight which serves as an unbalance by initially rotating a first mass about a rotational axis relative to a second mass when the balancing unit is operational; and
an interrupter unit to disconnect the at least one balancing unit from a mechanical drive in a switched off state and connect it to the mechanical drive in a switched on state.

2. The internal combustion engine as claimed in claim 1, wherein the mechanical drive of the at least one balancing unit is a traction mechanism.

3. The internal combustion engine as claimed in claim 1, wherein the mechanical drive of the at least one balancing unit is a gearwheel drive.

4. The internal combustion engine as claimed in claim 1, wherein the interrupter unit comprises a clutch.

5. The internal combustion engine as claimed in claim 1, wherein the at least one balancing weight which serves as the unbalance has at least two segments which can be rotated about the rotational axis with respect to one another.

6. The internal combustion engine as claimed in claim 1, wherein the at least one balancing unit is synchronized with the crank drive during the switching on.

7. The internal combustion engine as claimed in claim 6, further comprising a locking and/or stopping mechanism for positioning the at least one balancing unit.

8. The internal combustion engine as claimed in claim 1, further comprising an engine controller, wherein the at least one balancing unit is switched on and off by the engine controller.

9. The internal combustion engine as claimed claim 1, wherein the internal combustion engine includes three cylinders which are arranged in line.

10. The internal combustion engine as claimed in claim 9, wherein mass forces of a first order and of a second order are balanced by selecting a suitable crankshaft throw and a suitable ignition sequence.

11. The internal combustion engine as claimed in claim 9, wherein the at least one balancing unit comprises two balancing weights which are arranged spaced apart from one another on a shaft, are positioned offset through 180° and balance a resulting mass moment which is effective in a central plane running through an internal cylinder.

12. The internal combustion engine as claimed in claim 11, wherein the balancing weights which have offset positions are at the same distance from a central plane of the internal cylinder and have an equally large mass.

13. A method for operating an internal combustion engine, comprising:
 switching on and off at least one mechanically driven balancing unit as a function of at least one operating parameter of the internal combustion engine, the at least one balancing unit including at least one balancing weight which serves as an unbalance and which rotates about a rotational axis when the balancing unit is operational,
 wherein an interrupter unit disconnects the at least one balancing unit from a mechanical drive in a switched off state and connects it to the mechanical drive in a switched on state.

14. The method as claimed in claim 13, wherein the at least one balancing unit is switched on and off as a function of rotational speed n of the internal combustion engine.

15. The method as claimed in claim 13, wherein the at least one balancing weight which serves as the unbalance has at least two segments which can be rotated with respect to one another about the rotational axis, and further comprising, if the balancing unit is nonoperational with segments positioned rotated with respect to one another through 180° when the balancing unit is switched on:
 accelerating the balancing unit and synchronizing it with a crank drive; and
 rotating the at least two segments of the balancing weight which serves as the unbalance.

16. An engine method, comprising:
 under a first condition,
  rotating a shaft to spin a balancing unit, the balancing unit including a first mass and a second mass arranged 180° apart on the shaft; and
 once a speed of the shaft is equal to a speed of a crankshaft of the engine, moving the second mass relative to the first mass until the first and second masses are aligned on the shaft.

17. The method of claim 16, further comprising, under a second condition, disengaging the shaft to stop the rotation of the shaft.

18. The method of claim 17, wherein the first condition comprises engine speed below a threshold, and wherein the second condition comprises engine speed above the threshold.

19. The method of claim 17, wherein disengaging the shaft further comprises disengaging the shaft via a clutch.

20. The method of claim 16, wherein the shaft is mechanically coupled to the crankshaft of the engine.

* * * * *